INVENTORS.
STANLEY W. BAKER.
JOHN E. RICE.
BY
ATTORNEY

March 11, 1952  S. W. BAKER ET AL  2,588,462
MULTISPEED TRANSMISSION
Filed June 30, 1949  4 Sheets—Sheet 4

INVENTORS.
STANLEY W. BAKER.
JOHN E. RICE.
BY
ATTORNEY

Patented Mar. 11, 1952

2,588,462

UNITED STATES PATENT OFFICE 2,588,462

MULTISPEED TRANSMISSION

Stanley W. Baker, Hackensack, and John E. Rice, Pompton Plains, N. J., assignors to Curtiss-Wright Corporation, a corporation of Delaware Application June 30, 1949, Serial No. 102,192

2 Claims. (Cl. 74—764)

This invention relates to multi-speed transmissions and is particularly directed to an improvement in the transmission illustrated in copending application Serial No. 609,432, filed August 7, 1945, now Patent No. 2,558,738, in the name of Davis et al.

The transmission disclosed in said copending application has been used on aircraft engines as a two-speed drive for their engine driven superchargers. Said transmissions have performed satisfactorily except for the short life of the one-way roller clutch employed therein. An object of the present invention comprises the provision of a two-speed transmission having all the advantages of the two-speed transmission disclosed in said copending application and in which the one-way roller clutch of said prior transmission has been eliminated. In accordance with the present invention the one-way roller clutch of said prior transmission has been replaced by a planetary gear train and a brake therefore.

Other objects of the invention will become apparent upon reading the annexed detailed description in connection with the drawing in which.

Figure 1:
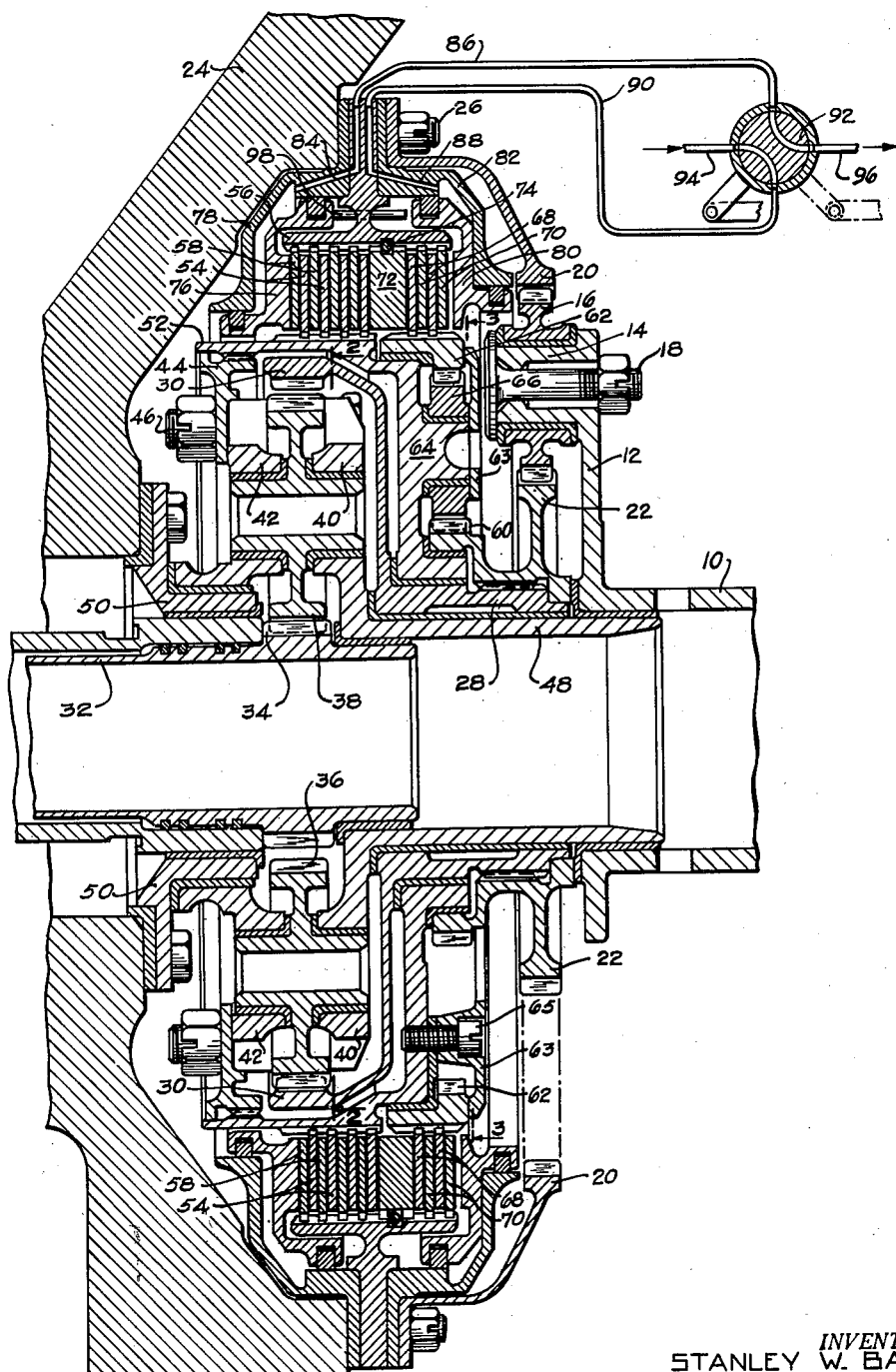
Figure 1 is an axial sectional view of a transmission embodying the invention.
Figure 2:
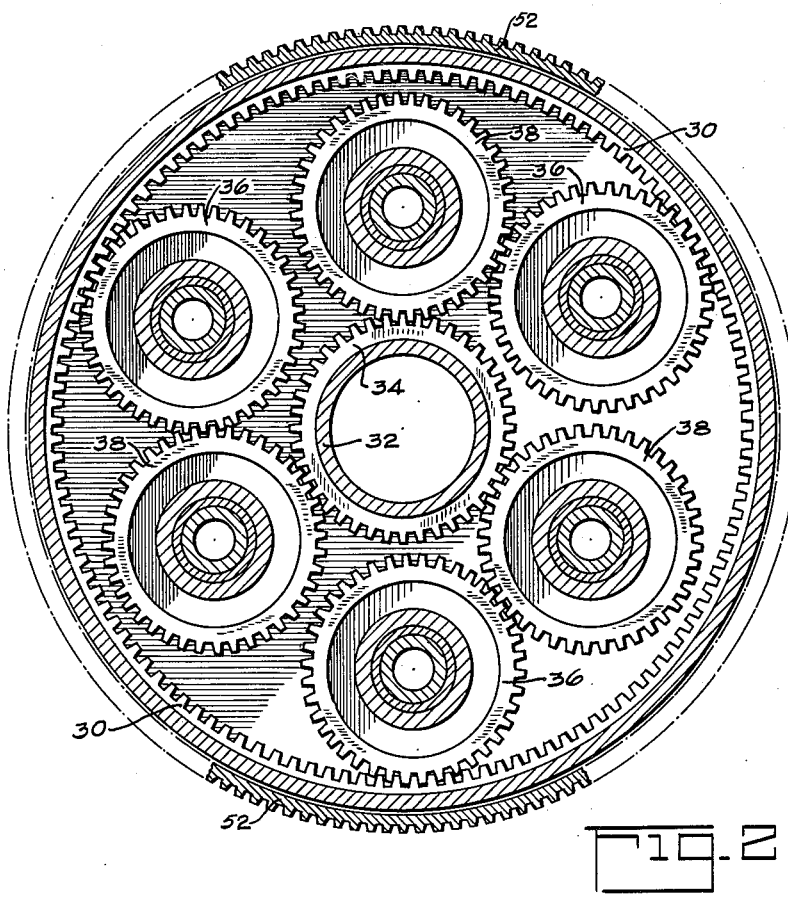
Figure 2 is a view taken along line 2—2 of Figure 1.
Figure 3:
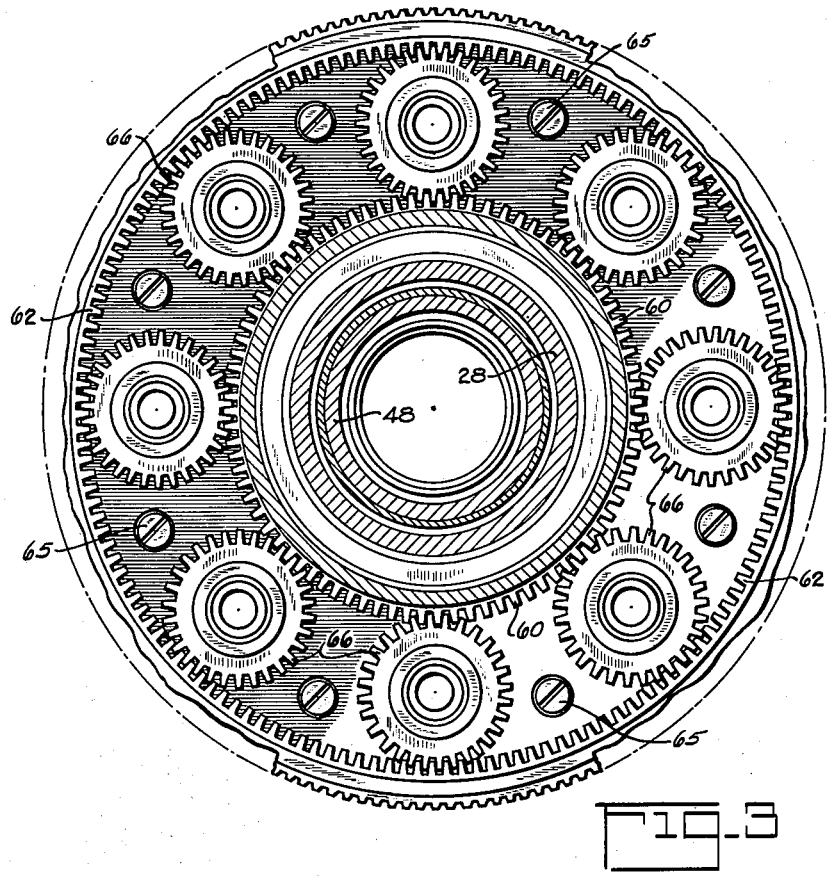
Figure 3 is a view taken along line 3—3 of Figure 1.

The invention has been designed for use as a two-speed drive for the supercharger of an aircraft internal combustion engine. As will appear, however, the invention is not limited to this specific use and instead is of general application. Referring first to Figures 1 to 3 of the drawing, a shaft 10 is arranged to be driven by an engine (not shown). The shaft 10 has a radially extending annular flange 12 having a plurality of circumferentially spaced stubs 14 formed thereon. Planet pinions 16 are journaled on the studs 14 and are secured thereto by bolts 18. Each pinion 16 is disposed in meshing engagement with an internal gear 20 and a sun gear 22, said sun gears being concentric. The internal sun gear is secured against rotation to a housing 24 by studs 26 whereby a step-up drive is provided from the engine driven shaft 10 to the sun gear 22. Preferably, the internal gear 20 is secured to the housing 24 through a flexible connection as described in said copending application.

The sun gear 22 is splined to a stub shaft 28 which forms the input shaft of the two-speed transmission. An internal gear 30 is formed integral with the shaft 28. A shaft 32, coaxial with the shaft 28, forms the output shaft of said transmission and a sun gear 34 is formed thereon concentric with the internal gear 30. A plurality of circumferentially spaced pairs of meshing planet pinions 36 and 38 are disposed between and in mesh with the gears 30 and 34 as best seen in Figure 2. The planet pinions 36 and 38 of each pair are disposed in meshing engagement with each other and each planet pinion 36 meshes with the internal gear 30 while each planet pinion 38 meshes with the sun gear 34.

The planet pinions 36 and 38 are journaled in a multi-part carrier member. This carrier member comprises parts 40, 42 and 44 secured together by bolts 46 passing between the pinions. The carrier part 40 has a hub portion 48 piloted within the input shaft 28 while the carier member part 42 is piloted on a drum 50 secured to the housing 24. The carrier member part 44 is splined to an annular rim 52. A plurality of annular friction brake plates are splined to and disposed externaly about the rim 52. A drum 56, secured to the housing 24 by the studs 26, is disposed about the rim 52. A plurality of annular friction brake plates 58 are splined to and disposed internally of the drum 56. The friction brake plates 54 and 58 are alternately disposed so that when said plates are clamped together the composite pinion carrier member 40, 42, and 44 is held against rotation whereupon a step-up speed ratio drive is provided from the input shaft 28 to the output shaft 32.

As described in the aforementioned copending application the double pinion ararngement is provided so as to drive the output shaft of the transmisssion in the same direction as the input shaft whereupon the reaction torque on the composite carrier member is equal to the difference between the input torque to the gear 30 and the output torque on the shaft 32. If, however, each planet pinion 36 and 38 were disposed in meshing engagement with both gears 30 and 34 then the output shaft 32 would rotate in a direction opposite to that of the input shaft 28. In this latter case the reaction torque on the composite planet carrier member would be equal to the sum of the input torque on the gear 30 and the output torque on the shaft 32 whereupon a much larger brake would be required to hold the composite carrier member stationary.

When the friction brake plates 54 and 58 are disengaged while power is being transmitted to the output shaft 32, the composite carrier member and rim 52 immediately start to rotate in the direction of rotation of the input gear 30 in response to the reaction torque acting on said composite carrier member. In the aforementioned copending application a one-way clutch is provided to limit this rotation of the carrier member to that of the engine driven shaft 10 thereby providing a low speed step-up drive to the output shaft. With the present invention, however, said one-way clutch has been eliminated and in its place a planetary gear train has been provided to limit the speed of rotation of the composite planet carrier member 40, 42, and 44 when the friction brake 54, 58 is released. For this purpose a sun gear 60 is formed rigid with the sun gear 22 and an internal gear 62, concentric with the sun gear 60, is piloted on the rim 52. In addition, the rim 52 is formed integral with a carrier member 64 whereupon said carrier member is rotationally rigid with the composite carrier member 40, 42, and 44. A plurality of circumferentially spaced pinions 66 are journaled on the carrier member 64. The pinions 66 are disposed in meshing engagement with the gears 60 and 62 and said pinions are held in position on their carrier member 64 by a plate 63 and screws 65. Annular friction brake plates 68 are splined to and disposed about the gear 62. Another set of annular friction brake plates 70 are splined to and disposed internally of the drum 56. The friction brake plates 68 and 70 are alternately disposed and are adapted to be clamped together to secure the gear 62 against rotation.

With this construction, when the brake plates 54 and 58 are disengaged and the brake plates 68 and 70 are engaged, the planetary gear train comprising the gears 60, 62, and 66 restrains rotation of the planet carrier 64 to a speed less than that of the input shaft 28. Accordingly, since the composite carrier member 40, 42, and 44 rotates at the same speed as the carrier member 64, a reduced step-up speed ratio drive is provided from the input shaft 28 to the output shaft 32. Within limits any low speed ratio may be obtained by proper selection of the pitch diameters of the gears 60, 62 and 66. Obviously, no such variation is possible with the one-way clutch design of said aforementioned copending application. As illustrated, the pitch diameters of the various gears are approximately such that when the brake plates 54 and 58 are disengaged and the brake plates 68 and 70 are engaged, the carrier member 64 and the composite carrier member 40, 42, and 44 rotate at the speed of the engine driven shaft 10 whereupon the low speed ratio obtained is the same as that provided by the one-way clutch in said copending application.

A backing plate 72 is disposed between the friction brake plates 54 and 58 and the friction brake plates 68 and 70 and a locking wire 74 is provided to prevent axial movement of said backing plate. A piston 76, slidable within an annular member 78, is adapted to clamp the friction brake plates 54 and 58 together against the backing plate 72. A piston 80, slidable within an annular member 82, is adapted to clamp the friction brake plates 68 and 70 together against the backing plate 72. The annular members 78 and 82 are secured to the housing 24 by the studs 26. Hydraulic pressure can be applied behind the piston 76 through a passageway 84 and a conduit 86 for effecting clamping engagement of the brake plates 54 and 58. Similarly hydraulic pressure can be applied behind the piston 80 through a passageway 88 and a conduit 90 for effecting clamping engagement of the friction brake plates 68 and 70. The conduits 86 and 90 are connected to a control valve 92 to which a hydraulic fluid, for example lubricating oil, is supplied through a conduit 94. A drain passage 96 is also connected to the valve 92. In the position of the valve 92 illustrated in the drawing, fluid under pressure is supplied behind the piston 76 for effecting clamping engagement of the brake plates 54 and 58. At the same time the space behind the piston 80 is vented to the drain passage 96 whereby the friction brake plates 68 and 70 are disengaged. Accordingly when the valve 92 is in its full line position, as illustrated in the drawing, the transmission provides a high speed ratio step-up drive from the input shaft 28 to the output shaft 32. If the valve 92 is moved to its dot-and-dash line position, then the space behind the piston 76 is vented to the drain passage 96 thereby disengaging the friction brake plates 54 and 58. At the same time fluid under pressure is supplied behind the piston 80 for effecting engagement of the friction brake plates 68 and 70. Accordingly, when the valve 92 is moved to its dot-and-dash line position, the transmission provides a relatively low speed ratio step-up drive from the input shaft 28 to the output shaft 32. One or more pins 98 may be provided to positively insure disengagement of one set of brake plates while the other set is being engaged.

Figure 4:
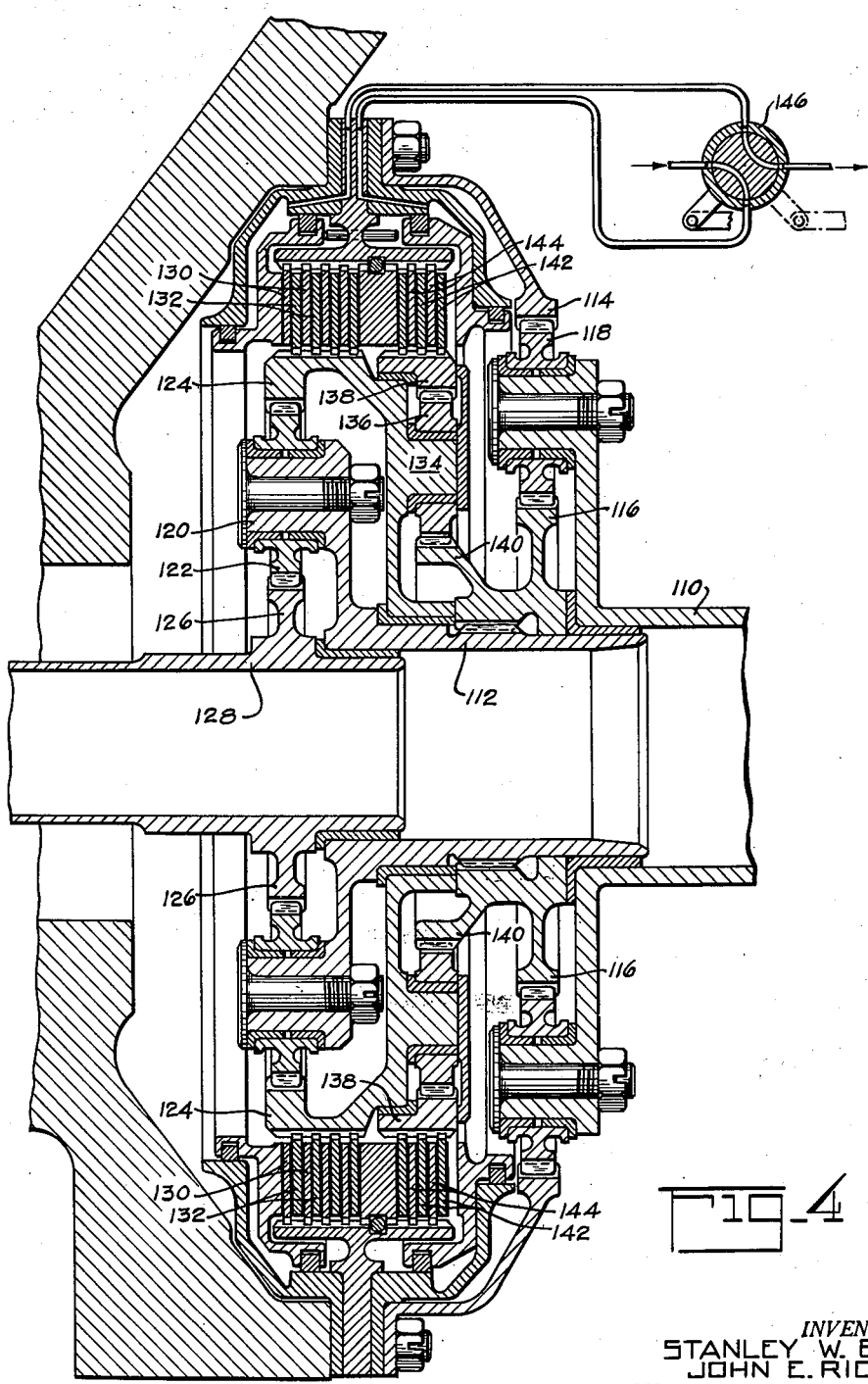
Figure 4 is an axial sectional view of a modified form of transmission embodying the invention.

Referring now to Figure 4 which comprises a modified form of the invention, a shaft 110, driven from the engine, is drivably connected to a stub shaft 112 through a gear train comprising an internal gear 114, a sun gear 116 and a plurality of circumferentially spaced pinions 118 thereby providing a step-up speed ratio connection from the shaft 110 to the shaft 112. The shaft 112 is formed integral with a planet carrier member 120 on which a plurality of circumferentially spaced planet pinions 122 are journaled. The planet pinions 122 are disposed in meshing engagement with an internal gear 124 and a sun gear 126, said later sun gear being integral with the output shaft 128 of the transmission.

Friction brake plates 130 and 132 are provided for holding the internal gear 124 against rotation whereupon a step-up speed ratio drive is provided from the shaft 112 to the shaft 128. If now the friction brake plates 130 and 132 are disengaged then the internal gear 124 will rotate in the direction of the input shaft 112 in response to the reaction torque acting on said internal gear. A planetary gear train is provided for limiting the speed of rotation of the internal gear 124 in response to said reaction torque. For this purpose the internal gear 124 is formed integral with a planet carrier member 134 having circumferentially spaced planet pinions 136 journaled thereon. The planet pinions 136 are disposed in meshing engagement with an internal gear 138 and with a sun gear 140. The sun gear 140 being formed integral with the sun gear 116. Friction brake plates 142 and 144 are provided to hold the internal gear 138 against rotation.

With this construction of Figure 4 if, while power is being transmitted, the friction brake plates 130 and 132 are disengaged and the friction brake plates 142 and 144 are engaged, then the internal gear 124 is restrained to rotate at a speed less than the speed of the input shaft 122 by the planetary gear train provided by the gears 136, 138 and 140. Accordingly a relatively low speed ratio step-up drive is provided from the input shaft 112 to the output shaft 128 when the friction plates 142 and 144 are engaged and the friction plates 130 and 132 are disengaged. The engagement and disengagement of said friction plates is controlled by a valve 146 in much the same manner as the friction brake plates of Figure 1 are controlled by the valve 92 so that no further description of the friction brakes of Figure 4 is deemed necessary.

The relative advantages and disadvantages of the modifications of Figures 1 and 4 are substantially the same as those set forth for the modifications of Figures 5 and 1 respectively of said copending application. In both modifications of the present invention, the two-speed transmission comprises two planetary gear trains, the one planetary gear train providing a high speed ratio drive when its reaction member is held against rotation and when said reaction member is released the other planetary gear train operates to limit the speed of rotation of said reaction member to provide a low speed ratio drive. In both modifications of the present invention, the transmission is controlled by two brakes thereby eliminating the one-way clutch difficulties previously mentioned. In addition neither of said modifications includes any hydraulically operated clutch with the sludging difficulties usually associated with such clutches.

Another advantage of the present invention over that described in said copending application is that in both speed ratios the transmission can transmit torque not only in the direction described but also in the reverse direction, that is torque can be transmitted from the shaft described as the output shaft to the input shaft. If either of the modifications disclosed in said copending application were used for transmitting torque in said reversed direction then its one-way clutch would be ineffective to provide any driving connection and only its friction brake would be effective to provide a driving connection between the input and output shafts. With the present invention, however, the two speed ratios of the transmission are the same regardless of the direction in which torque is transmitted. As herein used the term "speed ratio" of a pair of drivably connected rotatable members is defined as the ratio of the speed of the faster moving member to the speed of the slower moving member.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. A multi-speed transmission comprising a first planetary gear train including an internal gear, a sun gear, a pinion carrier member, and a plurality of pinions on said carrier member and disposed in meshing engagement with said gears; a first brake means engageable to prevent rotation of said carrier member to provide a high speed ratio between said gears, said carrier member being arranged to rotate in the direction of the torque acting thereon by said gear train upon release of said brake means during transmission of torque by said gear train; a second planetary gear train including a pinion carrier member connected to said first-mentioned carrier member, a sun gear connected to said internal gear, an internal gear, and a plurality of pinions on said second-mentioned carrier member and disposed in meshing engagement with the sun and internal gears of said second gear train; and a second brake means engageable upon release of said first brake means to prevent rotation of the internal gear of said second gear train whereupon said second gear train is effective to limit the speed of rotation of the carrier member of said first gear train in the direction of said reaction torque thereby providing a low-speed ratio between the internal and sun gears of said first gear train.

2. A multi-speed transmission having input and output drive transmitting members and comprising a first planetary gear train including a pair of concentric gears one for and drivably connected to each of said members for joint rotation therewith, a pinion carrier and a plurality of pinions on said carrier and disposed in meshing engagement with said gears for drivably connecting said gears; a first brake means engageable to prevent rotation of said carrier, said carrier being arranged to rotate in the direction of the torque acting thereon by said gear train upon release of said brake means during transmission of torque by said gear train; a second planetary gear train including a pair of concentric gear members, a pinion carrier member and a plurality of pinions disposed in meshing engagement with said gear members, the carrier member of said second planetary gear train being connected to the carrier of said first planetary gear train for joint rotation therewith and one of the gear members of said second planetary gear train being connected to one of the gears of said first planetary gear train; and a second brake means engageable upon disengagement of said first brake means to prevent rotation of the other gear member of said second planetary gear train.

STANLEY W. BAKER.
JOHN E. RICE.

REFERENCES CITED

The following references are of record in the file of this patent:

UNITED STATES PATENTS

| Number | Name | Date |
|---|---|---|
| 992,321 | Wise | May 16, 1911 |
| 2,251,625 | Hale | Aug. 5, 1941 |
| 2,324,713 | McFarland | July 20, 1943 |
| 2,353,905 | Kelley | July 18, 1944 |
| 2,462,825 | Zimmerman | Feb. 22, 1949 |

FOREIGN PATENTS

| Number | Country | Date |
|---|---|---|
| 598,806 | Great Britain | Feb. 26, 1948 |